United States Patent [19]

Harrison

[11] 3,911,104

[45] Oct. 7, 1975

[54] GEL DENTIFRICES

[75] Inventor: Michael Harrison, Newcastle-Upon-Tyne, England

[73] Assignee: Colgate-Palmolive Company, New York, N.Y.

[22] Filed: Sept. 16, 1974

[21] Appl. No.: 506,379

Related U.S. Application Data

[63] Continuation of Ser. No. 182,143, Sept. 20, 1971, abandoned.

[30] Foreign Application Priority Data

Sept. 21, 1970 United Kingdom............... 44858/70

Nov. 27, 1970 United Kingdom............... 56577/70

[52] U.S. Cl. .................................................. 424/52
[51] Int. Cl.$^2$.......................................... A61K 7/18
[58] Field of Search ................................ 424/49–58

Primary Examiner—Richard L. Huff
Attorney, Agent, or Firm—Robert L. Stone; Herbert S. Sylvester; Murray M. Grill

[57] ABSTRACT

Visually clear dentifrices containing synthetic, amorphous complex salts of aluminosilicate and a fluoride-providing compound are disclosed.

8 Claims, No Drawings

GEL DENTIFRICES

This is a continuation, of Application Ser. No. 182,143 filed Sept. 20, 1971, now abandoned.

This invention relates to gel dentifrices. In particular, it relates to dentifrices which are visually substantially clear and contain a fluorine-providing component.

Dentifrices which are visually clear, i.e. substantially transparent or translucent, are appealing to consumers. To be effective in cleaning the teeth, a polishing agent or abrasive ingredient has been included in dentifrices.

Synthetic, amorphous complex salts of aluminosilicates provide polishing while permitting the dentifrice to remain visually translucent or transparent, that is substantially clear. However, other dentifrice components have rendered such compositions opaque and often too liquid. In particular, customary amounts of stannous fluoride tend to be undesirable in such dentifrices.

It is an advantage of this invention that a substantially clear gel dentifrice containing an aluminosilicate is provided which contains a fluorine-providing component and retains its clarity.

Other advantages will be apparent from consideration of the following specification.

According to the present invention, there is provided a visually substantially clear dentifrice comprising a dentally acceptable substantially water-insoluble particulate polishing agent in a gel vehicle having substantially the same refractive index as said polishing agent, said polishing agent being a complex aluminosilicate salt of an alkali metal or alkaline earth metal in which silica is interbonded with alumina and having a refractive index of about 1.44–1.47, up to about 20% by weight of moisture and up to about 10% by weight of alkali metal or alkaline earth metal oxide and said polishing agent being substantially invisible in said gel vehicle and an alkali metal fluorine-providing compound in amount which provides an effective, non-toxic amount of fluorine-containing ion, such as a simple fluoride or a complex ion including fluorine.

The dentifrice may be formulated as a clear gel. The complex aluminosilicate salt described above is typically alkaline in nature, typically a sodium or calcium salt, and may effectively promote oral hygiene. It is an amorphous powder which further has the property that when incorporated in a gel or liquid vehicle the particles thereof become substantially invisible. Thus, a particle size for the polishing agent is up to about 40 microns, preferably 1–20 microns. The typical moisture content, measured by loss on ignition, is about 5–20% by weight of the agent and the typical content of alkali metal oxide, such as sodium oxide or alkaline earth metal oxide, such as calcium oxide, is up to about 10% by weight. Alumina is typically present in amount up to about 10% by weight and silica typically in amount of at least about 70% by weight typically, the agent has a loose bulk density of up to about 0.2g/cc preferably about 0.07–0.12g/cc.

The polishing agent typically comprises about 5–50% by weight of the dentifrice formulation, preferably about 10–30% by weight.

The complex aluminosilicate salt appears to contain interbonded silica and alumina having Al—O—Si bonds as described by Tamela, "Chemistry of the Surface and the Activity of Alumina-Silica Cracking Catalyst", Discussions of the Faraday Society, No. 8, Pages 270–279 (1950) and particularly at Page 273, FIG. 1, Curve 3 wherein the interaction between silica and aluminum ions is potentiometrically detected. Further literature describing this type of complex includes Milliken et al., "The Chemical Characteristics and Structures of Cracking Catalysts", Discussion of the Faraday Society, No. 8, Pages 279–290 (1950) and particularly the sentence bridging Pages 284–285. These complexes clearly differ from silica gel as is described by Plank et al., "Differences Between Silica and Silica-Alumina Gels I. Factors Affecting The Porous Structure of These Gels," Journal of Colloid Science, 2, Pages 399–412 (1947) and Plank, "Differences Between Silica and Silica-Alumina Gels II. A Proposed Mechanism for the Gelation and Syneresis of These Gels," Journal of Colloid Science 2, Pages 413–427, (1947) in which formation of the Al—O—Si bond is described at Pages 419–422.

The alkali metal fluorine-providing compound includes sodium fluoride, potassium fluoride, lithium fluoride, ammonium fluoride and complex fluorides, particularly alkali metal monofluorophosphates. These compounds exhibit satisfactory retentions of soluble fluoride in dentifrices of the instant invention. In particular, the level of retention of monofluorophosphate ion as fluoride with the alkali metal monofluorophosphates is quite high. The fluorine-containing compound is employed in amount which provides an effective non-toxic amount of fluorine-containing ion to the dentifrice, typically about 0.01–1% by weight preferably about 0.1% fluorine. Thus, sodium fluoride is typically employed in amount of about 0.02–2% by weight, preferably about 0.2%, and sodium monofluorophosphate, $Na_2PO_3F$, in amount of about 0.1–7.6% by weight, preferably about 0.76%.

The alkali metal monofluorophosphate which may be employed include sodium monofluorophosphate, lithium monofluorophosphate, potassium monofluorophosphate and ammonium monofluorophosphate. The preferred salt is sodium monofluorophosphate, $Na_2PO_3F$, which, as commercially available, may vary considerably in purity. It may be used in any suitable purity provided that any impurities do not substantially adversely affect the desired properties. In general, the purity is desirably at least about 80%. For best results, it should be at least 85%, and preferably at least 90% by weight of sodium monofluorophosphate with the balance being primarily impurities or by-products of manufacture such as sodium fluoride, water-soluble sodium phosphate salt, and the like. Expressed in another way, the sodium monofluorophosphate employed should have a total fluoride content of above 12%, preferably above 12.7%; a content of not more than 1.5%, preferably not more than 1.2% of free sodium fluoride; and a sodium monofluorophosphate content of at least 12%, preferably at least 12.1%, all calculated as fluorine.

Other monofluorophosphate salts which may be used in the instant invention include monofluoropolyphosphates such as $Na_4P_3O_9F$, $K_4P_3O_9F$, $(NH_4)_4P_3O_9F$, $Na_3KP_3O_9F$, $(NH_4)_3NaP_3O_9F$ and $Li_4P_3O_9F$.

The gel or liquid vehicle of the dentifrice preferably forms a mass of a consistency which desirably can be extruded from a collapsible tube such as an aluminum tube or a lead tube. The vehicle contains liquid and solid. In general, the liquid portion comprises water, glycerine, aqueous sorbitol and the like, including suitable mixtures thereof. It is usually advantageous to use a mixture of both water and a humectant such as glycerine, sorbitol or the like. The total liquid content is generally about 20–94.5% by weight of the visually clear dentifrice, and typically includes about 0–30% by weight of water, 0 - about 80% by weight of glycerine, and 0 to about 80% by weight of sorbitol. Preferably about 0–20% by weight of water, about 15–40% by weight of glycerine and 0 to about 80% by weight of sorbitol are present in the dentifrice.

In the liquid portion of the vehicle, sorbitol is suitably employed as a 70% by weight aqueous solution which has a refractive index of 1.45. Glycerine alone or admixed with the sorbitol solution does not substantially alter this desirably refractive index from that of the polishing agent, since glycerine has a refractive index of 1.47. Thus, an aqueous mixture of sorbitol and a substantial amount of glycerine is eminently satisfactory.

The solid portion of the vehicle is a gelling agent, such as the natural and synthetic gums and gum-like materials, such as Irish Moss, gum tragacanth, alkali metal carboxymethyl cellulose and hydroxyethyl carboxymethyl cellulose, polyvinyl pyrrolidone, starch, water soluble, hydrophilic colloidal carboxyvinyl polymers, such as those sold under the trademark Carbopol 934 and 940 and synthetic inorganic silicated clays such as those sold under the trademark Laponite CP and Laponite SP. These grades of Laponite have the formula $[Si_8Mg_{5.1}Li_{0.6}H_{7.6}O_{24}]^{0.6-}Na^+_{0.6}$. The solid portion of the vehicle is typically present in amount up to about 10% by weight of the dentifrice and preferably about 0.5–5% by weight. When employed, grades of Laponite are preferably used in amounts of about 1–5% by weight.

Organic surface-active agents may be used in the compositions of the present invention to achieve increased prophylactic action, assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface active agent a detersive material which imparts to the composition detersive and foaming properties. Suitable types of such detergents are water-soluble salts of higher fatty acid monoglyceride monosulphates, such as the sodium salt of the monosulphated monoglyceride of hydrogenated coconut oil fatty acids, higher alkyl sulphates, such as sodium lauryl sulphate, alkyl aryl sulphonates, such as sodium dodecyl benzene sulphonate, olefin sulphonates, such as sodium olefin sulphonate in which the olefin group contains 12–21 carbon atoms, higher alkyl sulphoacetates, higher fatty acid ester of 1,2-dihydroxy propane sulphonates, and the substantially saturated higher aliphatic acyl amides of lower aliphatic amino carboxylic acid compounds, such as those having 12–16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosine, which should be substantially free from soap or similar higher fatty acid material which tends to substantially reduce the effect of these compounds. The use of these sarcosine compounds in dentifrice compositions of the present invention is particularly advantageous since these materials exhibit a prolonged and marked effect in the inhibition of acid formation in the oral cavity due to carbohydrates breakdown in addition to exerting some reduction in the solubility of tooth enamel in acid solutions.

Other particularly suitable surface active materials include nonionic agents such as condensates of sorbitan monostearate with approximately 60 moles of ethylene oxide, condensates of propylene glycol ("Pluronics") and amphoteric agents such as quaternized imidazole derivatives, which are available under the trademark "Miranol" such as Miranol $C_2M$. Cationic surface active germicides and antibacterial compounds such as di-isobutylphenoxyethocyethyl dimethyl benzyl ammonium chloride, benzyl dimethyl stearyl ammonium chloride, tertiary amines having one fatty alkyl group (of from 12–18 carbon atoms) and two (poly) oxyethylene groups attached to the nitrogen (typically containing a total of from about 2 to 50 ethanoxy groups per molecule) and salts thereof with acids, and compounds of the structure

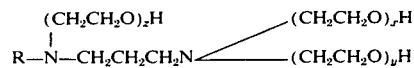

where R is a fatty alkyl group containing from about 12 to 18 carbon atoms, and $x$, $y$ and $z$ total 3 or higher, as well as salts thereof with mineral or organic acids, may also be used. It is preferred to use from about 0.05 to 5% by weight of the foregoing surface-active materials in the instant oral preparations.

Any suitable flavouring or sweetening materials may be employed in formulating a flavor for the compositions of the present invention. Examples of suitable flovouring constituents include the flavouring oils, e.g., oils of spearmint, peppermint, wintergreen, sassafras, clove, sage, eucalyptus, majoram, cinnamon, lemon and orange, as well as methylsalicylate. Suitable sweetening agents include, sucrose, lactose, maltose, sorbitol, sodium cyclamate, perillartine and saccharine. Suitably, flavour and sweetening agents may together comprise from about 0.01 to 5% or more of the compositions of the instant invention. Chloroform may also be used.

Various other materials may be incorporated in the oral preparations of this invention. Examples thereof are colouring or whitening agents or dyestuffs, preservatives, silicones, chlorophyll compounds, ammoniated materials such as urea, diammoniumphosphate and mixtures thereof, and other constituents. The adjuvants are incorporated in the instant compositions in amounts which do not substantially adversely affect the properties and characteristics desired and are selected and used in proper amounts depending upon the particular type of preparation involved.

Antibacterial agents may also be employed in the oral preparations of the instant invention in an amount of about 0.01–5% by weight. Typical antibacterial agents include $N^1$-(4-chlorobenzyl)-$N^5$-(2,4-dichlorobenzyl)biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1,6-bis(2-ethylhexylbiguanido)hexane;

1-(lauryldimethylammonium)-8-(p-chlorobenzyl-
  dimethylammonium) octane dichloride;
5,6-dichloro-2-guanidinobenzimidazole;
N¹-p-chlorophenyl-N⁵-laurylbiguanide;
5-amino-1,3-bis(2-ethylhexyl)-5-methylhexahydro
  pyrimidine;
and their non-toxic acid addition salts.

Additional water-insoluble dental polishing agents may be used as part of the polishing agent with the aluminosilicate compound, to modify the polishing character, if desired. They are used in amount such that the total polishing agent is up to about 60% by weight of the dentifrice preparation. These additional polishing agents include dicalcium phosphate, tricalcium phosphate, insoluble sodium metaphosphate, aluminum hydroxide, magnesium carbonate, calcium carbonate, calcium pyrophosphate, calcium sulfate, polymethyl methacrylate, bentonite, etc., including suitable mixtures thereof.

These additional polishing agents, when included substantially clear dentifrices should be present in small amounts, such as up to about 10% by weight of the dentifrice, typically up to about 10% by weight of the total polishing agent, since they tend to decrease transparency.

Synthetic finely divided silicas such as those sold under the Trade Marks Cab-O-Sil M-5, Syloid 244, Syloid 266 Aerosic D200 and mixtures thereof, may also be employed in amounts of about 0.5–20% by weight to promote thickening or gelling and to improve clarity of the dentifrice.

In the manufacture of dentifrices, it is conventional to remove entrained air from the product by de-aeration under vacuum typically at a late stage in the manufacture. In an aspect of the instant invention, it has been observed that in clear dentifrice gels of suitable viscosity, the dispersed, immobile air bubbles desirably enhance the appearance of the dentifrice, and can, therefore, be permitted to remain. Furthermore, air can be at least partially removed and reintroduced as substantially globular or spheroidal bubbles of say about 0.1 to 8mm in size, well distributed in the gel at an average of at least about one per cubic centimeter. Such air bubbles may be placed in the gel by stirring it while introducing the air. Instead of air, bubbles of another gas, such as nitrogen or carbon dioxide, can be introduced in non-toxic quantity. In particular, carbon dioxide can provide an effervescent character to the dentifrice.

In the event it is desired to have a minimum amount of air in the dentifrice, or only to have to remove a minimum amount of air from the dentifrice of the instant invention, the "Unimix" apparatus described in "Process Engineering" September 11, 1970, Pages 81–85, is particularly efficacious for this purpose. In this apparatus a mixing tool can be rotated in clockwise or counter-clockwise manner, and the action of the mixing tool is followed by the action of a scraper blade to ensure that the working surface of the apparatus is scraped clean. Preferably, a plastic such as polytetrafluoroethylene is used as the scraper from a raised central column in the apparatus and the further presence of a hydraulically operated vacuum tight lid permits but little air to enter the formulation during processing. Thus, gelling agent and a portion of liquid including water and/or humectant can be efficiently blended in the Unimix apparatus. Then the remaining liquid can be separately blended with the polishing agent and additional components (except for post-added components, such as flavouring oil) in the Unimix, and then the two dispersions blended together in the Unimix apparatus. If desired, the small amount of air can be largely removed under the depressurized conditions in the apparatus. The apparatus can be used to blend ingredients at room temperature as well as at higher temperatures.

Furthermore, if desired, visible particles of dyes, pearlescent flakes or particles of insoluble salts of antibacterial agents such as the monofluorophosphate salt or the disarcosinate salt of 1,6-di-p-Chlorophenylbiguanidohexane, as well as other particles, can be distributed in the dentifrice.

The dentifrices should have a pH practicable for use. A moderately alkaline pH is preferred.

The following specific examples are further illustrative of the nature of the present invention, although it is understood that the invention is not limited thereto. All amounts are by weight unless otherwise indicated.

EXAMPLE 1

The following clear dentifrices are prepared and entrained air removed under vacuum:

| Components | A | Parts B | C |
|---|---|---|---|
| Glycerine | 30 | 30 | 30 |
| Sorbitol (70%) | 33 | 33 | 33 |
| Laponite SP | 2 | 2 | 2 |
| Sodium Aluminosilicate | 20 | 20 | 20 |
| Sodium N-lauroyl sarcosinate | 2 | 2 | 2 |
| Flavour and sweetener | 1.1 | 1.1 | 1.1 |
| Colour (Green) | 1 | 1 | 1 |
| Sodium fluoride | 0.2 | — | — |
| Sodium monofluorophosphate | — | 0.76 | — |
| Stannous fluoride | — | — | 0.4 |
| Water | 10.70 | 10.14 | 10.50 |

The sodium aluminosilicate employed is a complex having a refractive index of 1.47, a moisture content of less than 10%, an alumina content of 8.0%, a silica content of 78%, and a sodium oxide content of 10%.

Dentifrices A & B are substantially clear gels and provide fluorine-containing ion in effective amounts; particularly high levels of fluorine-containing ion is noted with dentifrice B. Dentifrice C turns an opaque blue-gray in the presence of stannous fluoride.

EXAMPLE 2

A substantially visually clear gel is also prepared when calcium aluminosilicate complex having similar refractive index and particle size, an alumina content of 2.85%, a silica content of above 70%, a calcium oxide content of below 10%, replaces the sodium aluminosilicate described in Composition B in the formulation of Example 1.

Other alkali metal and alkaline earth metal aluminosilicate non-toxic polishing agent which may be employed include the lithium, potassium, ammonium and magnesium salts.

It will be apparent to one skilled in the art that various modifications of the above examples may be made thereto.

I claim:

1. A visually substantially clear dentifrice comprising about 5–50% by weight of a dentally acceptable substantially water-insoluble particulate polishing agent in a gel vehicle having substantially the same refractive index as said polishing agent, said polishing agent being a synthetic amorphous complex aluminosilicate salt of an alkali metal or alkaline earth metal in which silica is interbonded with alumina and having a refractive index of about 1.44–1.47, up to about 20% by weight of moisture and up to about 10% by weight of alkali metal oxide or alkaline earth metal oxide and said polishing agent being substantially invisible in said liquid vehicle and an alkali metal fluorine-providing compound in amount which provides an effective, non-toxic amount of fluorine-containing ion.

2. The dentifrice claimed in claim 1 wherein said fluorine-providing compound is present in amount which provides about 0.01–1% of fluorine to the dentifrice.

3. The dentifrice claimed in claim 1 wherein said complex aluminosilicate salt is a sodium salt.

4. The dentifrice claimed in claim 1 wherein said complex aluminosilicate salt is a calcium salt.

5. The dentifrice claimed in claim 1 wherein said fluorine-providing compound is a monofluorophosphate.

6. The dentifrice claimed in claim 5 wherein said monofluorophosphate is sodium monofluorophosphate.

7. The dentifrice claimed in claim 1 wherein said gel vehicle comprises a liquid containing water, a humectant or mixtures thereof and comprising about 20–94.5% by weight of the dentifrice and a gelling agent comprising about 0.5–5% by weight of the dentifrice.

8. The dentifrice claimed in claim 7 wherein said liquid comprises up to about 30% by weight of water, about 15–40% by weight of glycerine humectant and up to about 80% by weight of sorbitol humectant.

* * * * *